United States Patent
Weber et al.

(10) Patent No.: US 10,960,733 B2
(45) Date of Patent: Mar. 30, 2021

(54) VEHICLE BODY

(71) Applicant: Dr. Ing. h.c. F. Porsche Aktiengesellschaft, Stuttgart (DE)

(72) Inventors: Sebastian Weber, Esslingen (DE); Tobias Posch, Wimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 254 days.

(21) Appl. No.: 15/884,425

(22) Filed: Jan. 31, 2018

(65) Prior Publication Data

US 2018/0244132 A1 Aug. 30, 2018

(30) Foreign Application Priority Data

Feb. 24, 2017 (DE) ...................... 10 2017 103 905.8

(51) Int. Cl.

| | |
|---|---|
| B60H 1/26 | (2006.01) |
| B60H 1/30 | (2006.01) |
| F01P 1/06 | (2006.01) |
| B62D 37/02 | (2006.01) |
| B62D 35/00 | (2006.01) |
| B60H 1/24 | (2006.01) |
| F01P 1/00 | (2006.01) |
| B62D 25/08 | (2006.01) |

(52) U.S. Cl.
CPC ............... B60H 1/30 (2013.01); B60H 1/244 (2013.01); B62D 35/007 (2013.01); B62D 37/02 (2013.01); F01P 1/06 (2013.01); B62D 25/082 (2013.01); F01P 2001/005 (2013.01)

(58) Field of Classification Search
CPC .......... B60H 1/30; B60K 11/08; B60K 11/04; B60K 11/085

USPC ............... 454/143; 180/68.1, 903, 906
See application file for complete search history.

(56) References Cited

U.S. PATENT DOCUMENTS

| | | | | |
|---|---|---|---|---|
| 4,889,382 A | * | 12/1989 | Burst | B60K 11/08 |
| | | | | 296/180.5 |
| 5,120,105 A | | 6/1992 | Brin et al. | |
| 8,997,907 B2 | | 4/2015 | Rode | |
| 2015/0183313 A1 | * | 7/2015 | Bruckner | B60K 11/085 |
| | | | | 180/68.1 |
| 2015/0239337 A1 | * | 8/2015 | Anderson | B60K 11/04 |
| | | | | 180/68.1 |

FOREIGN PATENT DOCUMENTS

| | | |
|---|---|---|
| DE | 3615584 A1 | 11/1987 |
| DE | 4009385 A1 | 9/1991 |
| DE | 102013112003 A1 | 4/2015 |

* cited by examiner

*Primary Examiner* — Vivek K Shirsat
(74) *Attorney, Agent, or Firm* — Leydig, Voit & Mayer, Ltd.

(57) ABSTRACT

A vehicle body of a vehicle with a rear engine includes a rear structure that defines a receiving space for the rear engine; an assembly support connected to the rear structure and having at least one recess for passage of air; an air-guiding device mounted on the assembly support and having a retractable and extendable upper part and additionally having a fixed lower part with at least one recess for the passage of air; and a protective grille inserted into the respective recess of the lower part of the air-guiding device. The protective grille is assigned a covering element that is configured to be shiftable relative to the protective grille in order to open up or to close openings defined by the protective grille.

19 Claims, 2 Drawing Sheets

VEHICLE BODY

CROSS REFERENCE TO RELATED APPLICATIONS

This application claims benefit to German Patent Application No. DE 10 2017 103 905.8, filed Feb. 24, 2017 which is hereby incorporated by reference herein.

FIELD

The invention relates to a vehicle body.

BACKGROUND

DE 10 2013 112 003 A1 discloses a vehicle body for a vehicle with a rear engine. The vehicle body known from this prior art has a rear structure consisting of side parts and a rear paneling which defines a receiving space for a rear engine. Furthermore, the vehicle body known from the prior art comprises an assembly support which is connected to the rear structure, wherein the assembly support serves for receiving a retractable and extendable air-guiding device. According to the prior art, a plurality of recesses which serve for the passage of air in the direction of the rear engine are introduced into the assembly support, wherein the recesses of the assembly support are provided with a protective grille in order to prevent dirt, foliage or the like from penetrating in the direction of the rear engine. The protective grilles are visible to a greater or lesser extent depending on the position of the retractable and extendable air-guiding device. Openings defined by the protective grilles are always opened up.

SUMMARY

In an embodiment, the present invention provides a vehicle body of a vehicle with a rear engine. The vehicle body includes a rear structure that defines a receiving space for the rear engine; an assembly support connected to the rear structure and having at least one recess for passage of air; an air-guiding device mounted on the assembly support and having a retractable and extendable upper part and additionally having a fixed lower part with at least one recess for the passage of air; and a protective grille inserted into the respective recess of the lower part of the air-guiding device. The protective grille is assigned a covering element that is configured to be shiftable relative to the protective grille in order to open up or to close openings defined by the protective grille.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
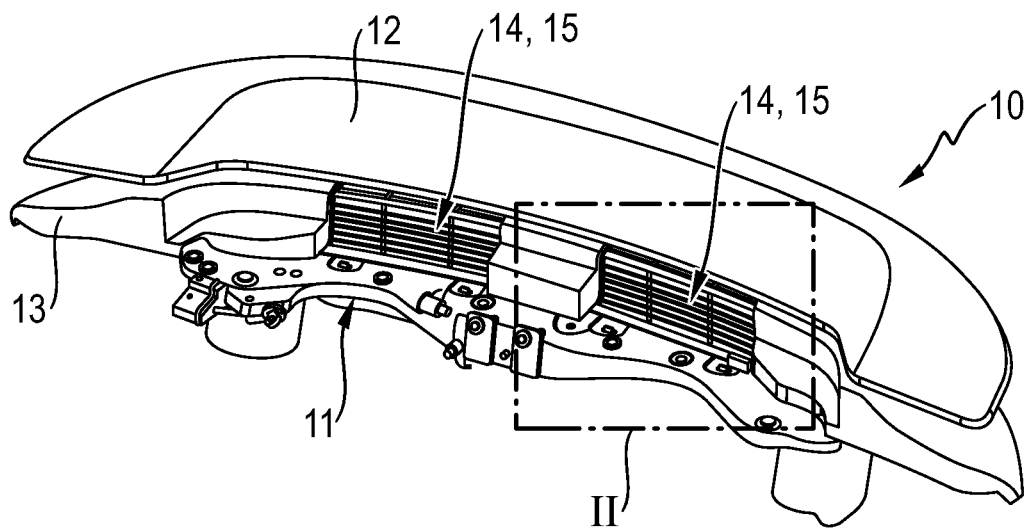
FIG. 1 shows a perspective view of an air-guiding device and an assembly support for receiving same.
Figure 2:
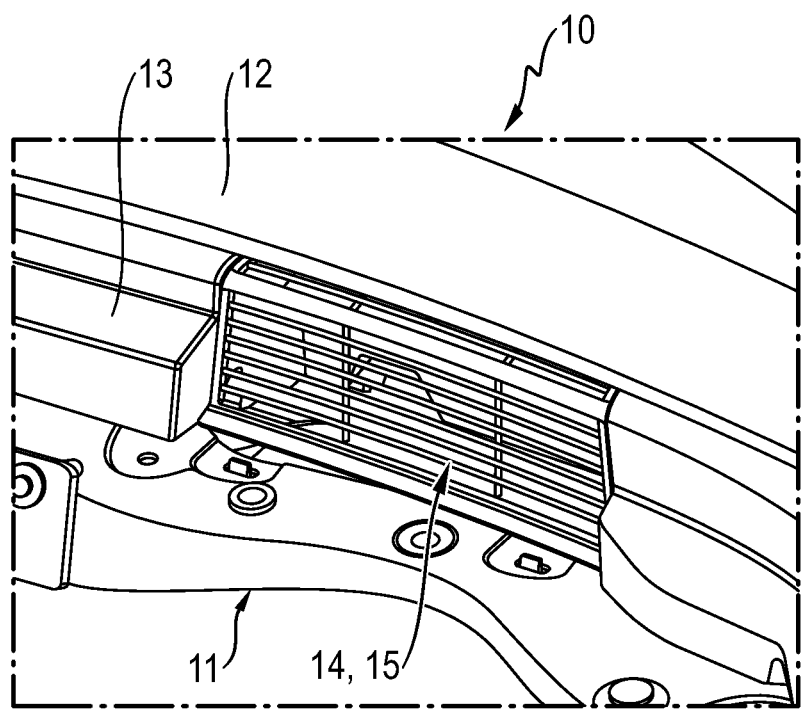
FIG. 2 shows the detail II of FIG. 1.

Embodiments of the invention provide novel vehicle bodies.

According to an embodiment of the invention, a vehicle body is provided having a protective grille is inserted into a recess of a lower part of an air-guiding device, wherein the respective protective grille is assigned a covering element which is shiftable relative to the respective protective grille in order to open up or to close openings defined by the respective protective grille.

In an embodiment, recesses which are introduced into a lower part of the air-guiding device are provided with a protective grille, wherein a covering element interacts with the respective protective grille, said covering element opening up or closing the openings of the protective grille depending on its relative position with respect to the protective grille. The passage of air through the protective grilles in the direction of the rear engine can thereby be adapted to meet requirements.

According to an embodiment of the invention, a protective grille is assigned a covering element which is shiftable relative to the respective protective grille in order to open up or to close openings defined by the respective protective grille. The passage of air through the protective grilles in the direction of the rear engine can thereby also be adapted to meet requirements.

According to embodiments of the invention, the respective covering element is shiftable between a first position, in which same closes all of the openings defined by the respective protective grille, and a second position, in which same opens up all of the openings defined by the respective protective grille, in such a manner that the respective covering element is shiftable into at least one intermediate position between the first position and the second position, in which intermediate position same closes some of the openings defined by the respective protective grille and opens up other of the openings defined by the respective protective grille.

In the first position and in the or each intermediate position, the respective covering element is either positioned at least in sections in front of the respective protective grille and thus covers the latter such that it is invisible from the outside, or, in the first position and in the or each intermediate position, the respective covering element is positioned at least in sections behind the respective protective grille and thus opens up the latter such that it is visible from the outside.

Whenever the vehicle is stationary, the respective covering element preferably takes up the first position.

In the event of a high performance requirement or high driving speeds of the vehicle, the covering element preferably takes up the second position.

In the event of relatively low driving speeds of the vehicle or relatively low performance requirements, the respective covering element can preferably take up an intermediate position.

According to embodiments of the invention, the respective covering element is guided in a guide and is shiftable via at least one drive. By means of the guide, the respective covering element is guided in each position thereof in an exactly defined orientation with respect to the protective grille. The drive serves for shifting the respective covering element relative to the respective protective grille.

The respective covering element is preferably realized in the form of a textile fabric and/or in the manner of a roller blind. Such a covering element is of low weight and is reliably shiftable relative to the respective protective grille.

FIG. 1 shows a cutout from a vehicle body with a rear engine in the region of an air-guiding device 10 and of an assembly support 11 for the air-guiding device 10, wherein the air-guiding device 10 is mountable via the assembly support 11 on a rear structure of the vehicle body, said rear structure defining a receiving space for the rear engine of the vehicle.

In the embodiment shown, the air-guiding device 10 comprises an upper part 12 which is retractable and extendable in relation to the assembly support 11, and a lower part 13 which is mounted fixedly on the assembly support 11. During the retraction and extension of the air-guiding device 10, namely of the upper part 12 of same, the upper part 12 is shiftable relative to the lower part 13 and assembly support 11.

In the embodiment shown, recesses 14 are introduced into the fixed lower part 13 of the air-guiding device 10, and a protective grille 15 is inserted into each of said recesses.

Air is guidable in the direction of the rear engine of the vehicle via said recesses 14 or the protective grilles 15 inserted into the recesses 14, wherein, for this purpose, recesses are also introduced into the assembly support 11, via which recesses the air finally flows into the receiving space for the rear engine.

Each of the protective grilles 15 inserted, in the exemplary embodiment shown, into a recess 14 of the lower part 13 of the air-guiding device 10 is assigned a covering element 16 which is shiftable relative to the respective protective grille 15. The covering element 16 opens up openings defined by the respective protective grille 15 or closes said openings depending on the relative position of the respective covering element 16 with respect to the respective protective grille 15.

Figure 3:
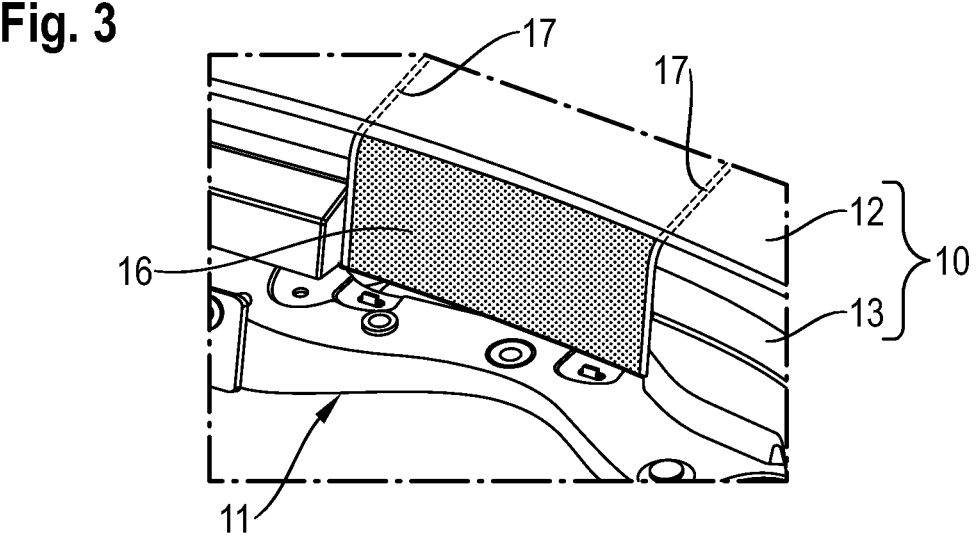
FIG. 3 shows the detail II of FIG. 1 with a covering element in a first position.
Figure 4:
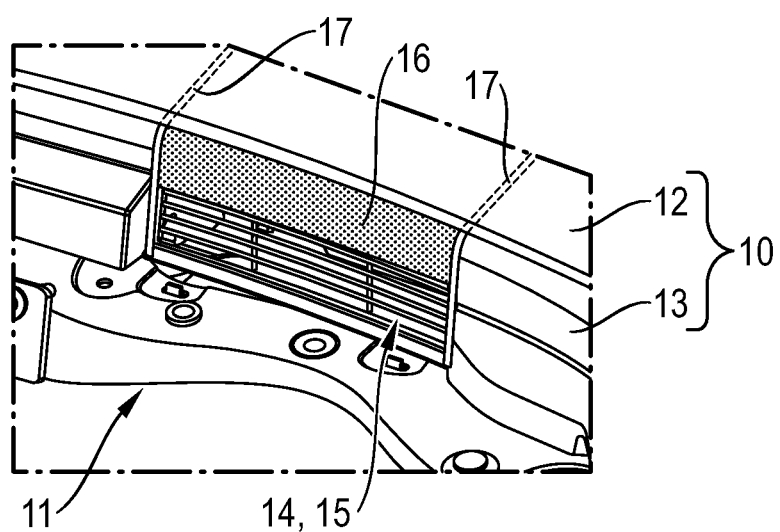
FIG. 4 shows the detail II of FIG. 1 with the covering element in an intermediate position.

The respective covering element 16 is shiftable between a first position (see FIG. 3), in which same closes all of the openings defined by the respective protective grille 15, and a second position (see FIG. 5), in which same opens up all of the openings defined by the respective protective grille 15, to be precise in such a manner that the respective covering element 16 is also shiftable into at least one intermediate position (see FIG. 4) between the first position and the second position, in which intermediate position the respective covering element 16 closes some of the openings defined by the respective protective grille 15 and opens up other of the openings defined by the respective protective grille 16.

In the embodiment, in the first position (FIG. 3) and in the or each intermediate position (FIG. 4), the respective covering element 16 is positioned in front of the respective protective grille 15 and covers the latter such that it is at least partially invisible from the outside.

Alternatively, it is, however, also possible that, in the first position and the respective intermediate position, the respective covering element 16 is positioned behind the respective protective grille 15 such that the latter then remains visible from the outside.

Figure 5:
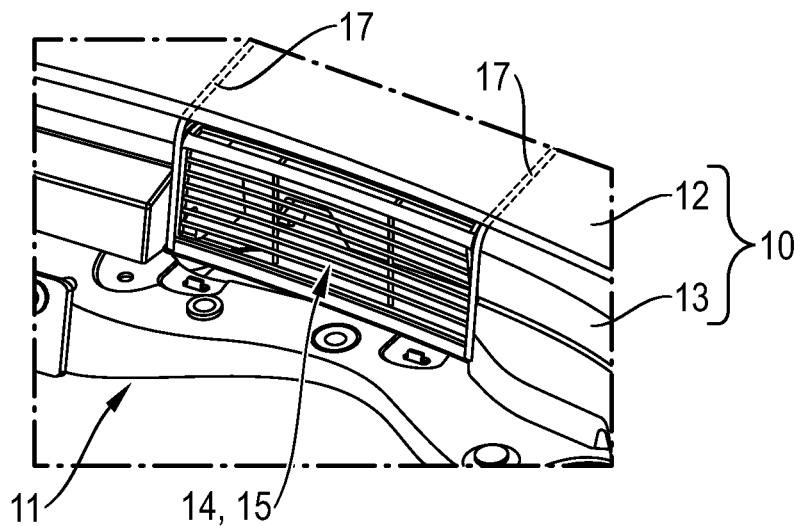
FIG. 5 shows the detail II of FIG. 1 with a covering element in a second position.

As shown in schematized form in FIG. 5, the respective covering element 16 is guided in a shiftable manner preferably in guides 17, wherein at least one drive (not shown) is in each case assigned to the respective covering element 16 for shifting purposes.

The or each guide 17 for the respective covering element 16 can be, for example, a slotted guide or the like.

The respective covering element 16 can be realized in the form of a textile fabric and/or in the manner of a roller blind or from a plurality of segments connected in an articulated manner to one another.

In a particularly preferred variant, it is provided that, in the first position (see FIG. 3) and in the or each intermediate position (see FIG. 4), the respective covering element 16 is integrated in a surface-flush manner in the lower part 13 providing the recess 14.

Embodiments of the invention are not restricted to vehicle bodies, the air-guiding device 10 of which has an upper part 12 and a lower part 13. Rather, embodiments of the invention can also be used in the case of air-guiding devices which merely have an upper part which is shiftable in relation to the assembly support 11. In this case, the protective grilles which are inserted into the recesses of the assembly support are each assigned a covering element which, in turn, is shiftable relative to the respective protective grille in order to open up or to close openings defined by the protective grille.

With embodiments of the invention, the openings defined by the protective grille can be opened up and closed to meet requirements. At a standstill, the respective covering element 16 in particular takes up the first position of FIG. 3. At high speeds or high performance requirements, the covering element in particular takes up the second position which is shown in FIG. 5. At low speeds or performance requirements, the covering element 16 can in particular take up the intermediate position shown in FIG. 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A vehicle body of a vehicle with a rear engine, comprising:
a rear structure that defines a receiving space for the rear engine;
an assembly support connected to the rear structure and having at least one recess for passage of air;

a spoiler assembly mounted on the assembly support and having a retractable and extendable upper part and additionally having a fixed lower part with at least one recess for the passage of air; and a protective grille inserted into the respective recess of the lower part of the spoiler assembly;

wherein the protective grille is assigned a covering element that is configured to be shiftable relative to the protective grille in order to open up or to close openings defined by the protective grille, the covering element being mounted in the lower part of the spoiler assembly such that it is adjacent the protective grille.

2. A vehicle body of a vehicle with a rear engine, comprising:

a rear structure that defines a receiving space for the rear engine, an assembly support connected to the rear structure and having at least one recess with a protective grille for passage of air; and a spoiler assembly mounted on the assembly support, wherein the protective grille is assigned a covering element that is configured to be shiftable relative to the protective grille in order to open up or to close openings defined by the protective grille, the covering element being mounted in the assembly support such that it is adjacent the protective grille.

3. The vehicle body as claimed in claim 1, wherein the covering element is configured to be shiftable between a first position, in which the covering element closes all of the openings defined by the respective protective grille, and a second position, in which the covering element opens up all of the openings defined by the respective protective grille, in such a manner that the respective covering element is configured to be shiftable into at least one intermediate position between the first position and the second position, in which intermediate position the covering element closes some of the openings defined by the respective protective grille and opens up other of the openings defined by the respective protective grille.

4. The vehicle body as claimed in claim 3, wherein in the first position and in the at least one intermediate position, the covering element is positioned at least in sections in front of the protective grille and therefore the protective grill is invisible from outside.

5. The vehicle body as claimed in claim 3, wherein, in the first position and in the at least one intermediate position, the covering element is positioned at least in sections behind the respective protective grille and therefore the protective grill is visible from outside.

6. The vehicle body as claimed in claim 1, wherein the covering element is guided in a guide and is configured to be shiftable via at least one drive.

7. The vehicle body as claimed in claim 1, wherein the covering element is a textile fabric.

8. The vehicle body as claimed in claim 1, wherein the covering element is a roller blind.

9. The vehicle body as claimed in claim 3, wherein, in the first position and in the at least one intermediate position, at least a portion of the covering element is integrated in a surface-flush manner in a component of the lower part providing the air opening and receiving the protective grille.

10. The vehicle body as claimed in claim 2, wherein the covering element is configured to be shiftable between a first position, in which the covering element closes all of the openings defined by the respective protective grille, and a second position, in which the covering element opens up all of the openings defined by the respective protective grille, in such a manner that the respective covering element is configured to be shiftable into at least one intermediate position between the first position and the second position, in which intermediate position the covering element closes some of the openings defined by the respective protective grille and opens up other of the openings defined by the respective protective grille.

11. The vehicle body as claimed in claim 10, wherein in the first position and in the at least one intermediate position, the covering element is positioned at least in sections in front of the protective grille and therefore the protective grill is invisible from outside.

12. The vehicle body as claimed in claim 10, wherein, in the first position and in the at least one intermediate position, the covering element is positioned at least in sections behind the respective protective grille and therefore the protective grill is visible from outside.

13. The vehicle body as claimed in claim 2, wherein the covering element is guided in a guide and is configured to be shiftable via at least one drive.

14. The vehicle body as claimed in claim 2, wherein the covering element is a textile fabric.

15. The vehicle body as claimed in claim 2, wherein the covering element is a roller blind.

16. The vehicle body as claimed in claim 10, wherein, in the first position and in the at least one intermediate position, at least a portion of the covering element is integrated in a surface-flush manner in a component of the lower part providing the air opening and receiving the protective grille.

17. The vehicle body as claimed in claim 1, wherein the rear structure comprises side parts and rear paneling that define the receiving space wherein the fixed lower part of the spoiler assembly is mounted fixedly on the assembly support, and wherein the upper part of the spoiler assembly is mounted on the fixed lower part, the fixed lower part coupling the upper part of the spoiler assembly to the assembly support.

18. The vehicle body as claimed in claim 17, wherein the fixed lower part of the spoiler assembly comprises an inner wall that vertically extends from a bottom side of the lower part mounted to the assembly support to a top side of the lower part adjacent to the upper part, and wherein the recess is in the inner wall of the fixed lower part.

19. The vehicle body as claimed in claim 18, wherein the recess and the protective grille entirely extend across a vertical height of the inner wall.

* * * * *